UNITED STATES PATENT OFFICE.

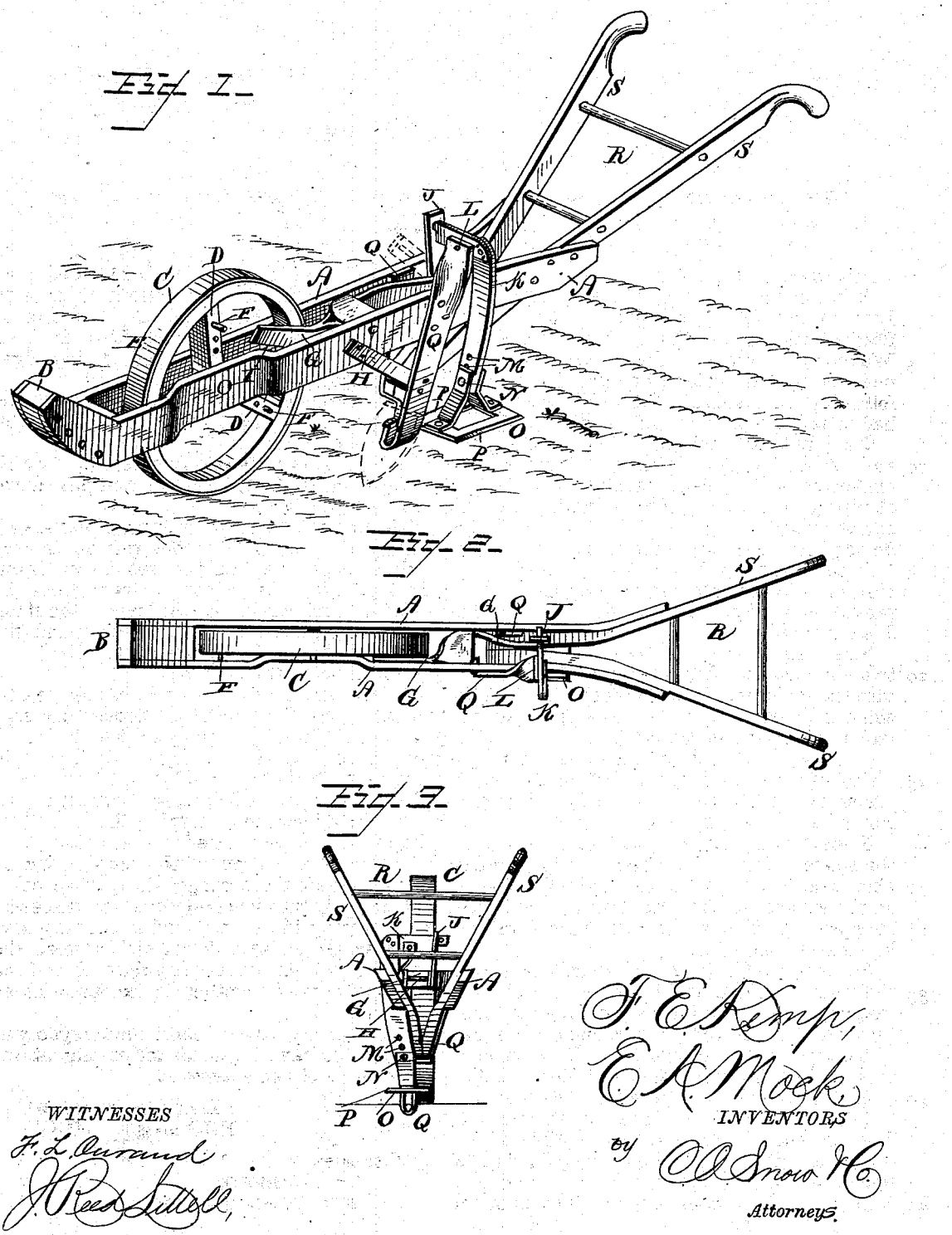

FRANCIS E. KEMP AND EUGENE A. MOCK, OF JESSUP, GEORGIA.

COTTON-CHOPPER.

SPECIFICATION forming part of Letters Patent No. 276,599, dated May 1, 1883.

Application filed January 27, 1883. (No model.)

*To all whom it may concern:*

Be it known that we, FRANCIS E. KEMP and EUGENE A. MOCK, citizens of the United States, residing at Jessup, in the county of Wayne and State of Georgia, have invented a new and useful Cotton-Chopper, of which the following is a specification, reference being had to the accompanying drawings.

This invention relates to cotton-choppers, and has for its object to provide a simple, inexpensive, and efficient machine, in which the chopping mechanism can be readily thrown out of operation or removed to admit of the device being used as a cultivator.

In the drawings, Figure 1 is a perspective view of a cotton-chopper embodying our improvements. Fig. 2 is a top view thereof. Fig. 3 is a rear end view.

Referring to the drawings, A A designate two longitudinal parallel beams, that constitute the main portion of the frame of the machine, and are adapted to have the draft attached to their front ends, B.

C is a wheel that is journaled between the main beams A A, near their front ends, and is preferably constructed with spokes D and a rim or felly E, as shown.

F designates pins, that project laterally from the spokes of the said wheel, and are preferably arranged to be adjusted longitudinally on the spokes, so as to regulate the cut of the chopper, which is operated by these pins, as hereinafter specified.

Between the beams A A and just in rear of the wheel C is fulcrumed a lever, G, which is weighted in front of its fulcrum H, so as to return the chopper after it has made a stroke. The under edge, I, of the lever G is beveled upwardly at its front end, and this beveled edge is successively engaged by the pins on the wheel C to rock the lever on its fulcrum. The rear end of this lever G is connected by a link, J, with a bell-crank lever, K, that is fulcrumed, as at L, on the frame of the machine. This bell-crank lever is vibrated on its fulcrum by the lever G, and is provided at its bottom with a series of perforations, M, through any of which passes a bolt, N, that secures the rectangular chopping-plate O to the bell-crank lever. The plate O has cutting-edges P P at each side.

Q Q are standards that extend from the beams A A and are arranged to carry the cultivator-blade.

R is the handle, the side pieces, S S, of which are secured to the beams A A and pass down between the standards Q Q.

The operation and advantages of our invention are obvious. The construction is very simple and is not liable to get out of order. By separating the bell-crank lever from the link that connects it with the lever G the chopper will be thrown out of operation, and the cultivator can be brought into use.

We claim as our invention—

1. The combination of two parallel beams, an operating-wheel journaled between the said beams and having laterally-projecting pins, a rock-lever fulcrumed between the beams in rear of the said wheel and weighted in front of its fulcrum, and a bell-crank lever connected to the rock-lever and carrying the knives or choppers at its free lower end, as set forth.

2. The combination of the parallel beams having standards arranged to carry a cultivator, a bell-crank lever fulcrumed on the beams and carrying at its lower end a double-edged chopper, a rock-lever fulcrumed between the beams, and a link connecting the rock and the bell-crank levers together, for co-operation as set forth.

In testimony that we claim the foregoing as our own we have hereto affixed our signatures in presence of two witnesses.

FRANCIS E. KEMP.
EUGENE A. MOCK.

Witnesses:
WM. NEWSOME,
JOHN N. GOONBRAVER.